July 31, 1928. Re. 17,053

W. K. KISE

OIL STOVE

Original Filed Dec. 19, 1921 2 Sheets-Sheet 1

INVENTOR
William K. Kise
BY
Arthur C. Brown
ATTORNEY

July 31, 1928. Re. 17,053

W. K. KISE

OIL STOVE

Original Filed Dec. 19, 1921 2 Sheets-Sheet 2

INVENTOR
William K. Kise.
BY
Arthur E. Brown
ATTORNEY

Reissued July 31, 1928. Re. 17,053

UNITED STATES PATENT OFFICE.

WILLIAM KENT KISE, OF KANSAS CITY, MISSOURI, ASSIGNOR TO THE EVERBRITE STOVE COMPANY, OF KANSAS CITY, MISSOURI, A CORPORATION OF MISSOURI.

OIL STOVE.

Original No. 1,514,773, dated November 11, 1924, Serial No. 523,303, filed December 19, 1921. Application for reissue filed October 30, 1926. Serial No. 145,333.

This invention relates to oil stoves in which is a burner adapted to utilize hydrocarbon fuel for generating the heat, and the invention consists in certain novel details of construction and arrangement of parts, all of which will be specifically referred to hereinafter, reference being had to the accompanying drawings, in which.

Figure 1:
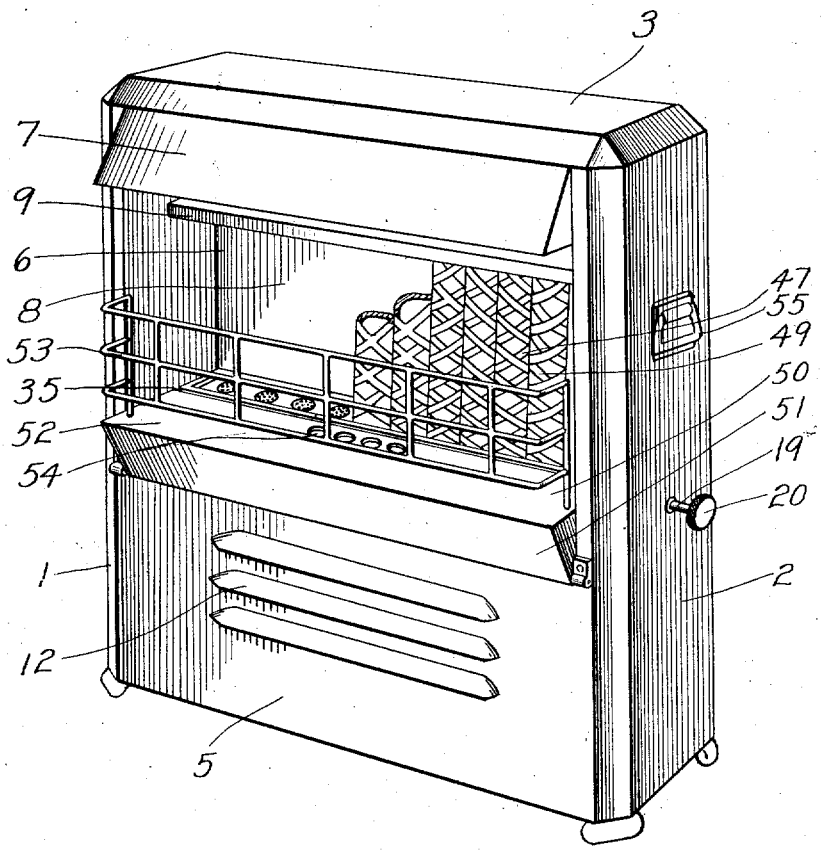
Fig. 1 is a perspective view, partly broken away, of an oil stove constructed in accordance with my invention.
Figure 2:
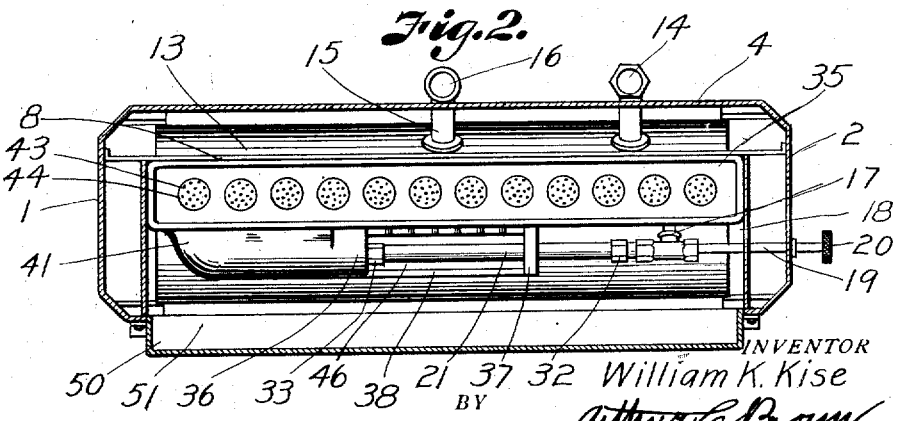
Fig. 2 is a horizontal sectional view through the same, with the radiants removed.

In carrying out the invention I prefer to provide a substantially rectangular stove casing having ends 1 and 2 connected by a top 3 and a back panel 4. The front panel 5 extends from the bottom of said stove a short distance toward the top to provide a heat discharging space 6 above the same, which co-operates with the hood 7 to permit the heat to pass out into the room, there being a heat reflector plate 8 in the rear of the space 6, which carries a transverse heat deflecting baffle 9 at its upper end, provided with an opening 10, through which the products of combustion may pass in order to exhaust through the discharge flue 11, which may be connected by a suitable pipe to the chimney.

The front panel 5 is provided with vent openings formed by louvers 12, if desired.

Supported in the bottom of the stove casing is a fuel tank 13, which may be provided with a filler tube 14 and the tank is also provided with an air inlet port shown as a tube 15, through which air may be forced to provide the necessary pressure on the fuel in the tank 13. I prefer to provide the tube 15 permanently with a pump 16 of appropriate construction so that the pump will always be available to increase the pressure in the tank to the desired degree.

Leading from the tank 13 is a discharge pipe 17, which is connected to a T-fitting 18, comprising a valve casing in which is a valve operated from the valve stem 19, extending through the end 2 and provided with a wheel 20 whereby the valve can be turned to vary the port area of the valve in the casing 18, which discharges into the generator 21.

The generator (see Fig. 5) is shown as comprising a tube or pipe, in one end of which is a ported plug 22, having a threaded end 23 to engage the end of the pipe and having a tapered, threaded nipple 24 to be screwed into one end of the casing 18. The pipe is provided at its opposite end with a screw plug 25, which has a threaded end 26 to engage corresponding threads in the end of the pipe and the plug is provided with a constricted discharge orifice 27, which discharges into the mixing chamber of the burner to be referred to hereinafter.

Figure 5:
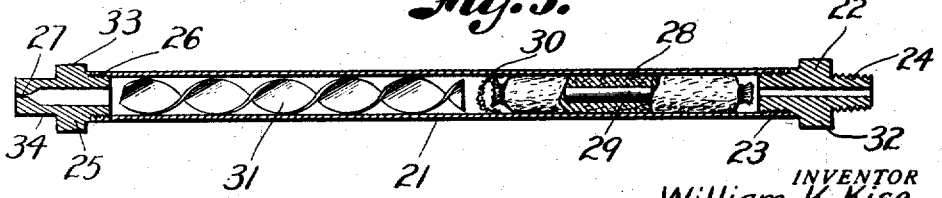
Fig. 5 is a longitudinal, sectional view through the vapor generator.

Within the pipe is a filter 28, shown as consisting of a tubular fibrous envelope surrounding a core 29 and having its ends closed over the core, as clearly shown in Fig. 5. The filter is adjacent the plug 22 and between it and a heat distributing or radiating member 31 is a strainer 30. The heat radiating member is shown as comprising a twisted ribbon or blade of metal having good heat conductivity so that the heat applied to the end of the tube surrounding the member 31 will be conducted to the fuel passing through the tube, it being understood that the filter is at one end of the tube, the heat radiating member at the other end, and the strainer between them.

By dividing the tube or generator 21 into a filtering chamber on one side of the strainer 30 and into a vapor generating chamber on the other side of the strainer 30, I am enabled to provide a novel, inexpensive form of generator having certain advantages over known types of generators. For example, in the present construction, the filter is to one side of the heat zone so that it will not be subjected to intense heat from the source of heat which vaporizes the oil. In other words, the filter, which is generally of asbestos, will not be subjected to intense heat so that it will not char or break down due to the action of the heat. Therefore, the life of the filter is much longer than it would be if it were subjected to the intense heat to which the zone about the ribbon 31 is subjected.

The plugs 22 and 25 may have polygonal or hexagonal portions 32 and 33 intermediate their ends to receive a wrench so that they may be screwed into position. The plug 25 has a projecting end 34, in which the orifice 27 is located so that said end of the generator tube can be supported by a bracket and discharge into the mixing chamber of the burner.

Figure 4:
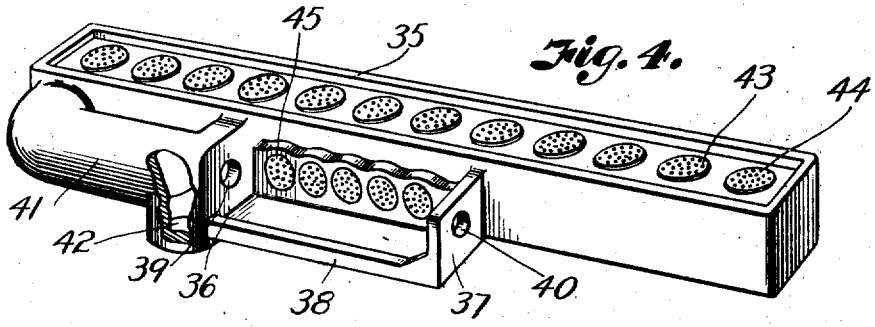
Fig. 4 is a detail perspective view, partly broken away, of an improved oil burner.

The burner is best shown in Fig. 4 as comprising an elongated, rectangular, hollow casting 35, from the front face of which project brackets 36 and 37 between which is provided a priming pan 38. The brackets 36 and 37 are provided with orifices 39 and 40 in horizontal alignment so that the vaporizer 21 may be supported therein.

The vaporizer rests upon the bottom edge of the orifice 40 with the end 34 in the orifice 39 so that the portion to one side of the screen 30 which carries the ribbon 31 is over the priming pan 38, the filter being entirely outside the heat zone, as heretofore explained. The mixing chamber has an air inlet opening 42, adjacent the opening 39 so that the discharged vaporized fuel passing from the orifice 27 may combine with the air and mix in the chamber 41, preparatory to passing into the hollow casting 35. The top of the casting 35 is provided with fuel discharge openings 43, in which may be located removable disks having fuel openings, and I prefer to use the well known lava disks, as indicated at 44, which may be removed to be cleaned or for substitution. In the front side of the member 35 and between the brackets 36 and 37 are corresponding disks 45 having fuel openings to direct a flame against the portion 46 of the vaporizer surrounding the ribbon 31 so that if the burner is operating, all of the fuel passing through the tube 21 will be subjected to heat from the fuel passing through the orifices in the disks 45 so that a continuous vaporization of the fuel will be provided before it combines with the air within the mixing chamber 41.

In order that the burner may be inexpensively made, I prefer to cast the member 35, the brackets 36 and 37, the pan 38 and the fuel mixer 41 in a single piece or casting, thereby minimizing the cost of production, and it is an important feature of my invention to arrange the burner in substantially the manner shown, as it is quite a convenient construction to make, providing efficient vaporization of the hydrocarbon fuel as it passes through the vaporizer 21 and affording efficient mixing with the air entering through the orifice 42 before it is allowed to enter the hollow casting member 35, preparatory to being ignited.

It will be apparent that the generator can be applied to the burner in a completely assembled position by introducing the end 34 into the orifice 39, allowing the generating tube 21 to lie upon the bottom wall of the orifice 40 with the filter outside the heat zone, and connected to the source of supply through the medium of the T-fitting 18 so that all of the parts will be assembled.

When the tank is filled and there is sufficient air pressure on the body of liquid, the priming pan 38 may receive a priming fluid such as alcohol, gasoline or the like, which may be ignited to heat the barrel of the generator or tube 21. When the valve stem 19 can be operated through the medium of the handle 20 to unseat the valve slightly to allow the fuel to pass through the generator and when it reaches the portion 46, it will be vaporized or gasified so that it will combine readily with the air entering the inlet 42. The mixture may then be ignited as it passes through the openings in the burner disks 44 and 45. When the fluid in the priming pan 38 has been consumed, the burner will supply its own heat energy through the openings in the disks 45 to the generator 21 so that the incoming fuel will be continuously vaporized or gasified as long as the burner is being used.

I find it particularly advantageous to use radiant units in connection with the burner. These may consist of upstanding strips or grids 47 having points or protuberances 48 on their front faces and directed toward the spaced grids 49 on said units. The grids 49 are preferably in front of the burner orifices while the grids 47 are preferably in rear so that the ignited fuel passes between them in a thin sheet, heating the projections 48 to incandesence, and raising the temperature of the fuel so that a very hot flame is provided, the radiant sections being assisted by the reflector 8 in radiating the heat through the opening 6.

It is an important feature of my invention that the protuberances 48 will be heated to an intense heat, practically to incandescence so that the gases discharging from the burner tips will have their temperature raised sufficiently to cause them to be highly combustible. Therefore, the gases which have not been consumed near the base of the burner will be consumed within the radiant sections, on account of the high temperature to which they are raised, so that practically perfect combustion takes place and the liability of unconsumed gases escaping into the room will be reduced to a minimum, if not wholly eliminated.

The radiant sections combined with the burner provide a structure of considerable importance in oil burning stoves because some of the less volatile constituents of the vaporized oil must be heated to a very high temperature before they can be consumed. So far as I am aware, the application of means for superheating the heavier hydrocarbons after they have passed through the burner tips so as to render them combustible is new as applied to oil burning stoves.

Figure 3:
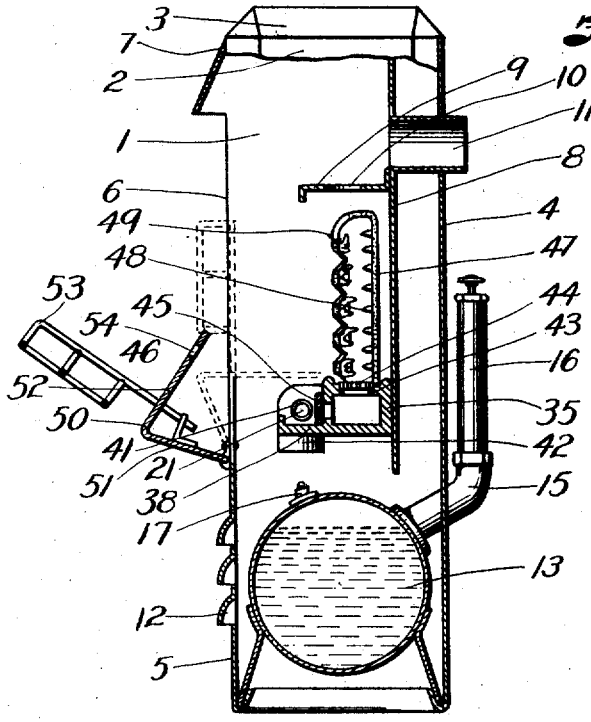
Fig. 3 is a vertical, transverse, sectional view, partly in elevation, through the stove.

For the sake of the esthetic value of the device as well as to act as a guard or protector, I hinge at the edge of the front panel a guard 50, which has an upwardly inclined portion 51 and a lateral ledge or shelf 52, the latter carrying a fender 53, which may consist of wire or other suitable material. The entire guard comprising the member 50 and the fender 53 may be swung outwardly, as shown in Fig. 3, so that access can be had to the priming pan when desired. Ordinarily, however, the priming pan will be hidden from view because the inner edge of the shelf 52 will coincide with the outer longitudinal edge of the member 35 and will overlap the brackets 36 and 37, there being vent openings 54 in the central portion of the shelf 52 to permit the products of combustion to pass upwardly through them.

I have found in actual practise that the arrangement of stove apparatus constructed in accordance with my invention practically consumes all of the fuel so that there is no perceptible odor resulting therefrom. Therefore, under certain conditions I can eliminate the flue 11 or if it is present, I will not in all instances connect it to the chimney. Thus, the device is rendered portable and can be moved from place to place through the medium of handles 55 on the ends 1 and 2 of the stove casing.

It will also be apparent that the filler tube 14 can be eliminated and the tank filled through the tube 15 although the more convenient way will be to utilize the tube 14.

From the foregoing it will be apparent that a stove constructed in accordance with my invention may be rendered portable, that it is adapted to generate heat from various kinds of hydrocarbon fuel, particularly of the quality known as fuel oil, and that the device may be easily constructed and assembled and will present a neat and attractive appearance.

What I claim and desire to secure by Letters Patent is:

1. An oil stove comprising a casing having an opening across the front thereof, a burner across the casing at the lower edge of the opening and having fuel openings in its upper face, and a guard hinged to the front of the casing at the lower edge of the opening and having an inwardly projecting fender-supporting shelf forming a part thereof.

2. An oil stove comprising a casing having an opening across the front thereof, a burner across the casing at the lower edge of the opening and having fuel openings in its upper face, a guard hinged to the front of the casing at the lower edge of the opening and having an inwardly projecting fender-supporting shelf forming a part thereof, and a hood projecting from the upper portion of the casing.

3. An oil stove comprising a casing having a front plate terminating short of the top thereof to provide an open front, the front plate having air vents therein, an oil burner in the casing, the upper portion of which is substantially in line with the top of the plate, a tank in the casing for supplying fluid to the burner, and a valve for controlling the effective port area between the burner and the tank.

In testimony whereof I affix my signature.

WILLIAM KENT KISE.